(12) United States Patent
Ge et al.

(10) Patent No.: US 9,536,549 B1
(45) Date of Patent: Jan. 3, 2017

(54) MULTIPLE SENSOR MAGNETIC REPRODUCING DEVICE WITH REDUCED INTER-SENSOR SPACING

(71) Applicant: Seagate Technology LLC, Cupertino, CA (US)

(72) Inventors: Zhiguo Ge, Edina, MN (US); Victor Sapozhnikov, Minnetonka, MN (US); Shaun E. Mckinlay, Eden Prairie, MN (US); Eric W. Singleton, Maple Plain, MN (US); Jae Young Yi, Prior Lake, MN (US); Mohammed Shariat Ullah Patwari, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/826,798

(22) Filed: Aug. 14, 2015

(51) Int. Cl.
*G11B 5/39* (2006.01)
*G11B 5/127* (2006.01)

(52) U.S. Cl.
CPC .......... *G11B 5/3912* (2013.01); *G11B 5/1272* (2013.01)

(58) Field of Classification Search
CPC ... G11B 5/3945; G11B 5/3948; G11B 5/3951; G11B 5/3954; G11B 5/3958; G11B 5/3961; G11B 5/3964
USPC ........................................ 360/314–316, 319
See application file for complete search history.

(56) References Cited

U.S. PATENT DOCUMENTS

| | | | |
|---|---|---|---|
| 7,375,405 B2 | 5/2008 | Fukuzawa et al. | |
| 7,656,610 B1* | 2/2010 | Campos | G11B 5/00826 360/121 |
| 8,164,862 B2 | 4/2012 | Zhang et al. | |
| 8,576,518 B1 | 11/2013 | Zeltser et al. | |
| 8,638,530 B1 | 1/2014 | Hsu et al. | |
| 8,786,987 B2 | 7/2014 | Edelman et al. | |
| 8,824,106 B1* | 9/2014 | Garfunkel | G11B 5/2654 360/316 |
| 8,873,204 B1* | 10/2014 | Gao | G11B 5/3912 360/319 |
| 8,891,207 B1* | 11/2014 | Li | G11B 5/115 360/121 |
| 8,922,935 B1 | 12/2014 | Ionescu | |
| 9,042,058 B1* | 5/2015 | Li | G11B 5/3912 360/316 |
| 9,042,059 B1* | 5/2015 | Katine | G11B 5/3909 360/316 |
| 9,087,527 B1* | 7/2015 | Li | G11B 5/02 |
| 9,099,125 B1* | 8/2015 | Hattori | G11B 5/3912 |
| 2002/0048690 A1 | 4/2002 | Fukuzawa et al. | |
| 2004/0121185 A1 | 6/2004 | Fukuzawa et al. | |

(Continued)

*Primary Examiner* — Will J Klimowicz
(74) *Attorney, Agent, or Firm* — Westman, Champlin & Koehler, P.A.

(57) ABSTRACT

A multi-sensor reader that includes a first sensor that has a sensor stack, which includes a free layer (FL) that has a magnetization that changes according to an external magnetic field. The first sensor also includes a shielding structure that is positioned over the sensor stack. The multi-sensor reader also includes a second sensor stacked over the first sensor. The second sensor includes a sensor stack, which includes a FL that has a magnetization that changes according to the external magnetic field. The multi-sensor reader further includes an isolation layer between the first sensor and the second sensor. A FL-to-FL spacing reduction feature is included in at least one of the isolation layer or the shielding structure.

8 Claims, 22 Drawing Sheets

(56) References Cited

U.S. PATENT DOCUMENTS

| | | | |
|---|---|---|---|
| 2010/0055502 A1* | 3/2010 | Kubota | B82Y 10/00 428/827 |
| 2012/0206830 A1 | 8/2012 | Gao et al. | |
| 2012/0250189 A1 | 10/2012 | Degawa et al. | |
| 2012/0276415 A1* | 11/2012 | Sapozhnikov | G01R 33/093 428/831 |
| 2013/0286502 A1 | 10/2013 | Erden et al. | |
| 2013/0314816 A1 | 11/2013 | Gao et al. | |
| 2014/0063644 A1 | 3/2014 | Lou et al. | |
| 2015/0043098 A1 | 2/2015 | Lammers et al. | |
| 2015/0062735 A1* | 3/2015 | Sapozhnikov | G11B 5/115 360/46 |
| 2015/0062755 A1* | 3/2015 | Sapozhnikov | G11B 5/3951 360/235.4 |
| 2015/0140685 A1* | 5/2015 | Watanabe | H01L 21/312 438/3 |

* cited by examiner

MULTIPLE SENSOR MAGNETIC REPRODUCING DEVICE WITH REDUCED INTER-SENSOR SPACING

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities.

SUMMARY

The present disclosure relates to a multi-sensor reader that addresses challenges posed by greater data density requirements and head skew relative to data tracks by including at least one feature that reduces inter-sensor spacing. The multi-sensor reader includes a first sensor that has a sensor stack, which includes a free layer (FL) that has a magnetization that changes according to an external magnetic field. The first sensor also includes a shielding structure that is positioned over the sensor stack. The multi-sensor reader also includes a second sensor stacked over the first sensor. The second sensor includes a sensor stack, which includes a FL that has a magnetization that changes according to the external magnetic field. The multi-sensor reader further incudes an isolation layer between the first sensor and the second sensor. A FL-to-FL spacing reduction feature is included in at least one of the isolation layer or the shielding structure.

Other features and benefits that characterize embodiments of the disclosure will be apparent upon reading the following detailed description and review of the associated drawings.

DETAILED DESCRIPTION OF ILLUSTRATIVE EMBODIMENTS

Magnetic reproducing device embodiments described below relate to multi-sensor readers that include at least one feature that reduces inter-sensor spacing. However, prior to providing additional details regarding the different embodiments, a description of an illustrative operating environment is provided below.

Figure 1:
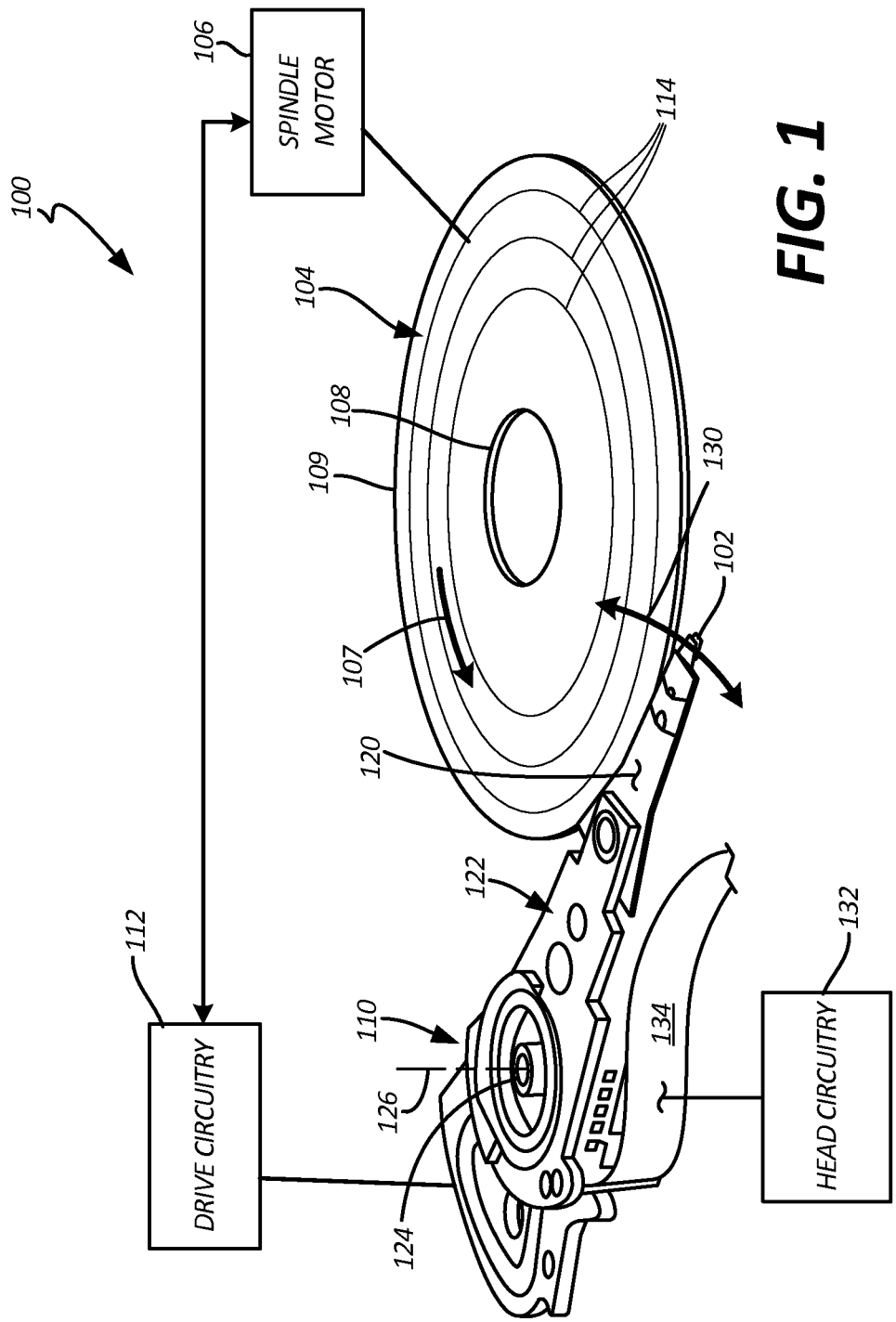
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
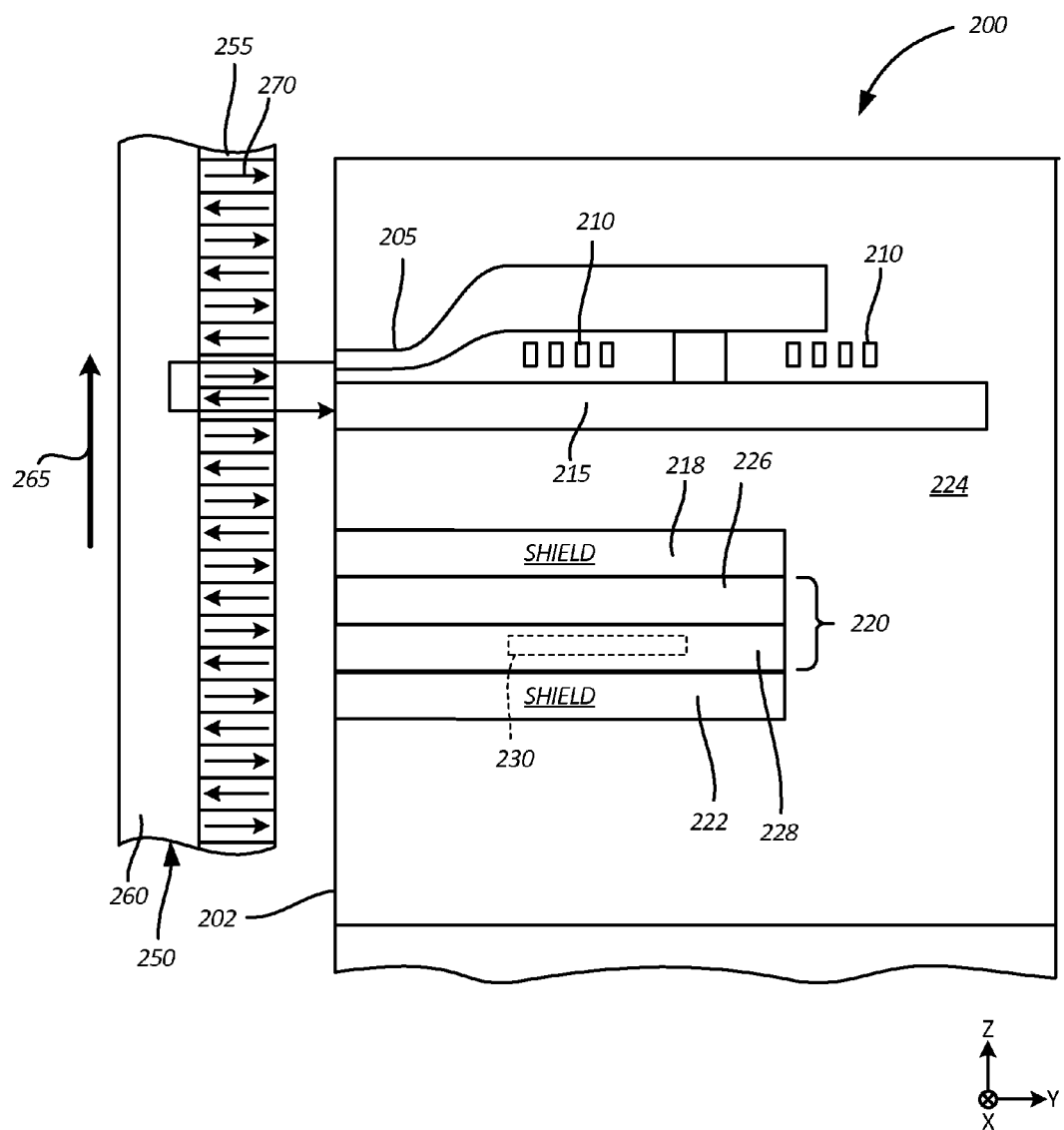
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
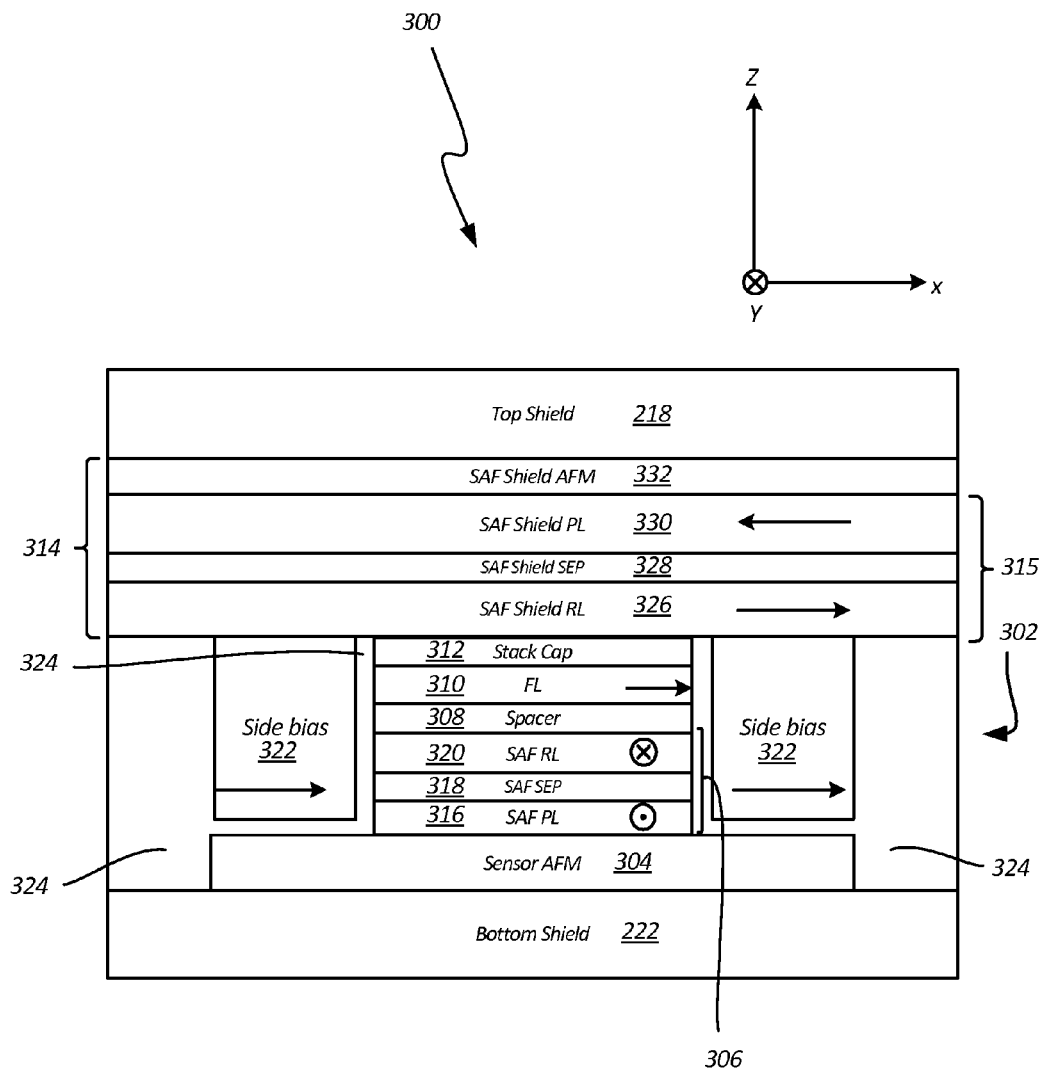
FIG. 3A is a bearing surface view of a magnetic reproducing device having a single read sensor.
Figure 3B:
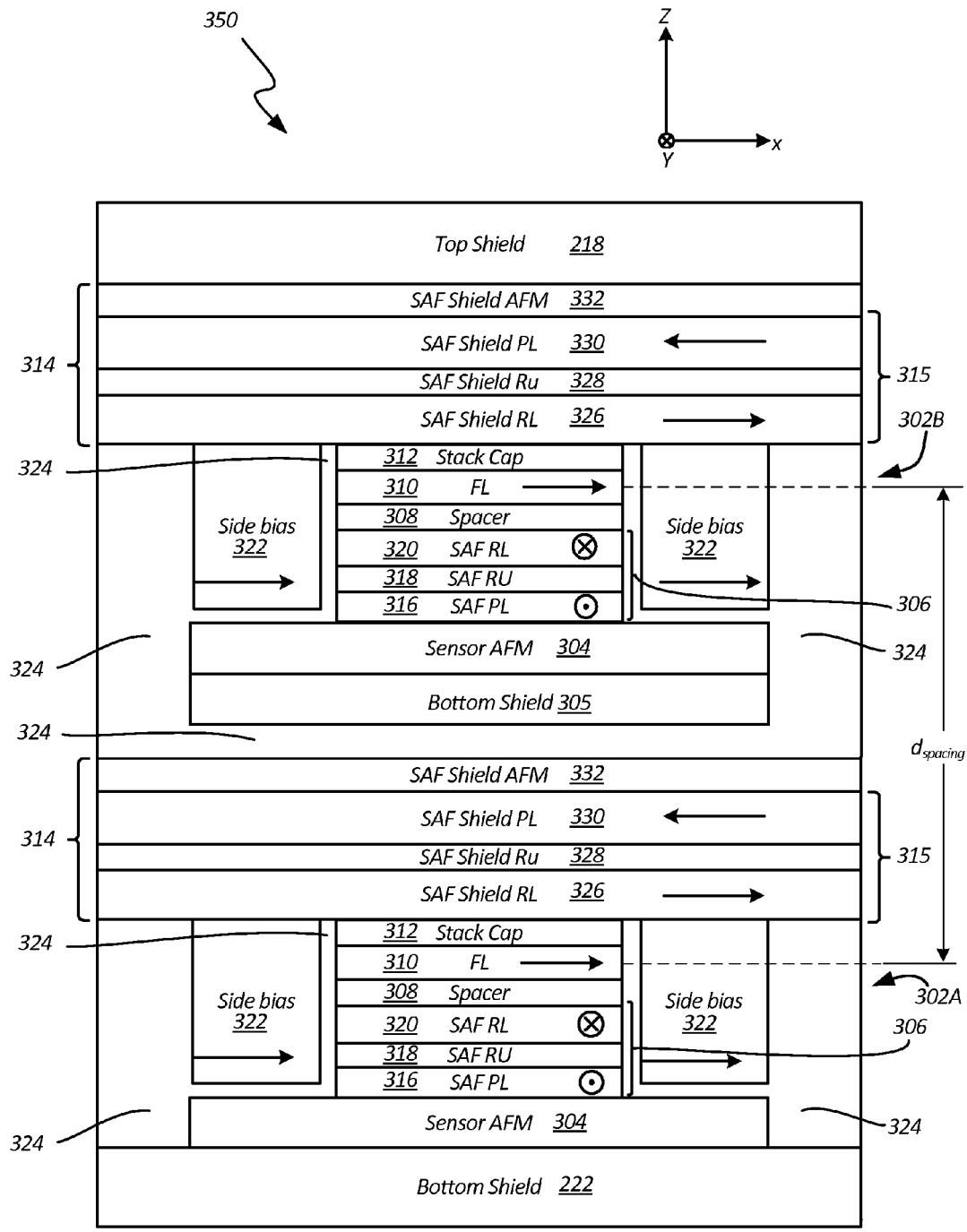
FIG. 3B is a bearing surface view of a magnetic reproducing device having multiple sensors of the type shown in FIG. 3A.

To address challenges posed by greater data density requirements and faster data transfer speeds, read transducer 220 includes multiple sensors 226 and 228. It should be noted that only two sensors 226 and 228 are shown in FIG. 2 in the interest of simplification. However, in different multi-sensor reader embodiments, any suitable number of sensors may be employed. In different multi-sensor reader embodiments, magnetic sensors may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. In the embodiment show in FIG. 2, sensors 226 and 228 are stacked along the track direction. In such embodiments, it is desirable to reduce spacing between primary sensing components of adjacent sensors 226 and 228 in order to achieve a high data storage density and because of head skew relative to the data tracks. Head skew is a natural result of the rotary actuator, which does not move the heads perfectly radially across the tracks, and is most pronounced near the inner and outer diameters of the disc (see FIG. 1). In the embodiment of FIG. 2, read transducer 220 includes at least one thickness/spacing reduction feature 230. Different layers of an embodiment of an individual sensor are shown in FIG. 3A, and FIG. 3B shows a multi-sensor reader including two sensors of the type shown in FIG. 3A. Details regarding inter-sensor spacing reduction in a multi-sensor reader are then provided further below in connection with FIGS. 4-11.

FIG. 3A is a schematic block diagram illustrating an example read head 300 including a single magnetoresistive sensor 302. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor antiferromagnetic (AFM) layer 304, a sensor stack synthetic antiferromagnetic (SAF) structure 306, a spacer layer 308, a free layer or sensing layer 310, a stack cap 312 and a SAF shielding structure 314.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (i.e., the y direction) of FIG. 3A and anti-parallel to each other.

In one implementation, the free layer 310 is not exchange coupled to, for example, an antiferromagnet. As a result, the magnetic moment of the free layer 310 is free to rotate under the influence of an applied magnetic field in a range of interest. The read head 300 further includes side biasing magnets or side shields 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. In some embodiments, the side biasing magnets or side shields 332 are formed of soft magnetic material (i.e., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, SAF shielding structure includes a SAF shield reference layer 326, a thin SAF shield separation layer 328, which may comprise a metal such as Ru in some embodiments, a SAF shield pinned layer 330 and a SAF shield AFM layer 332. Because sensor 300 utilizes soft side shields 322, SAF shield reference layer 326 needs to have a relatively fixed magnetization to assist in stabilizing the magnetizations of side shields 322. Thus, AFM layer 332 needs to pin the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, in some embodiments, there may be non-magnetic metal inserts (not shown) between SAF shield AFM 332 and top shield 218, and between sensor AFM 304 and bottom shield 222.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

FIG. 3B is a schematic block diagram illustrating an example read head 350 including multiple magnetoresistive sensors (for example, 302A and 302B) stacked along a track direction (i.e., the z-direction in FIG. 3B). Each of sensors 302A and 302B is substantially similar to sensor 302 of FIG. 3A and therefore a description of individual sensors 302A and 302B is not provided in connection with FIG. 3B. It should be noted that, depending on a direction of rotation of the data storage medium and the head design, one of top shield 218 and bottom shield 222 is the leading shield for the entire read head such as 350 and the other one of top shield 218 and bottom shield 222 is the trailing shield for the entire read head such as 350. Sensor 302B has its own bottom shield denoted by reference numeral 305. It some embodiments, sensors 302A and 302B in sensor 350 may be isolated from each other by isolation layer 324, which is present in a region between sensors 302A and 302B in FIG. 3B. In other embodiments, no isolation layer may be employed between individual sensors.

As indicated above, in the multi-sensor configuration, a critical parameter is the FL-to-FL spacing, d (in FIG. 3B), and is set by the additive thicknesses of a sensor and the shielding structures and insulator between the sensors. Further, as noted above, reducing d enables the multi-sensor reader to be implemented in a higher linear density drive and to perform suitably under skew. Several techniques for reducing FL-to-FL spacing in a multi-sensor reader are described below in connection with FIGS. 4-11. The different techniques involve modifications to shielding structure 314 and/or to isolation layer 324. The modifications may include forming one or more layers of the shielding structure 314 and/or the isolation layer 324 with materials selected to enable a reduction in thickness of the one or more layers of the shielding structure 314 and/or the isolation layer 324. The modifications may also include structural design changes to shielding structure 314 (i.e., changes to shielding element 315 and/or to an element such as 332, which stabilizes the shielding element 315).

Figure 4:
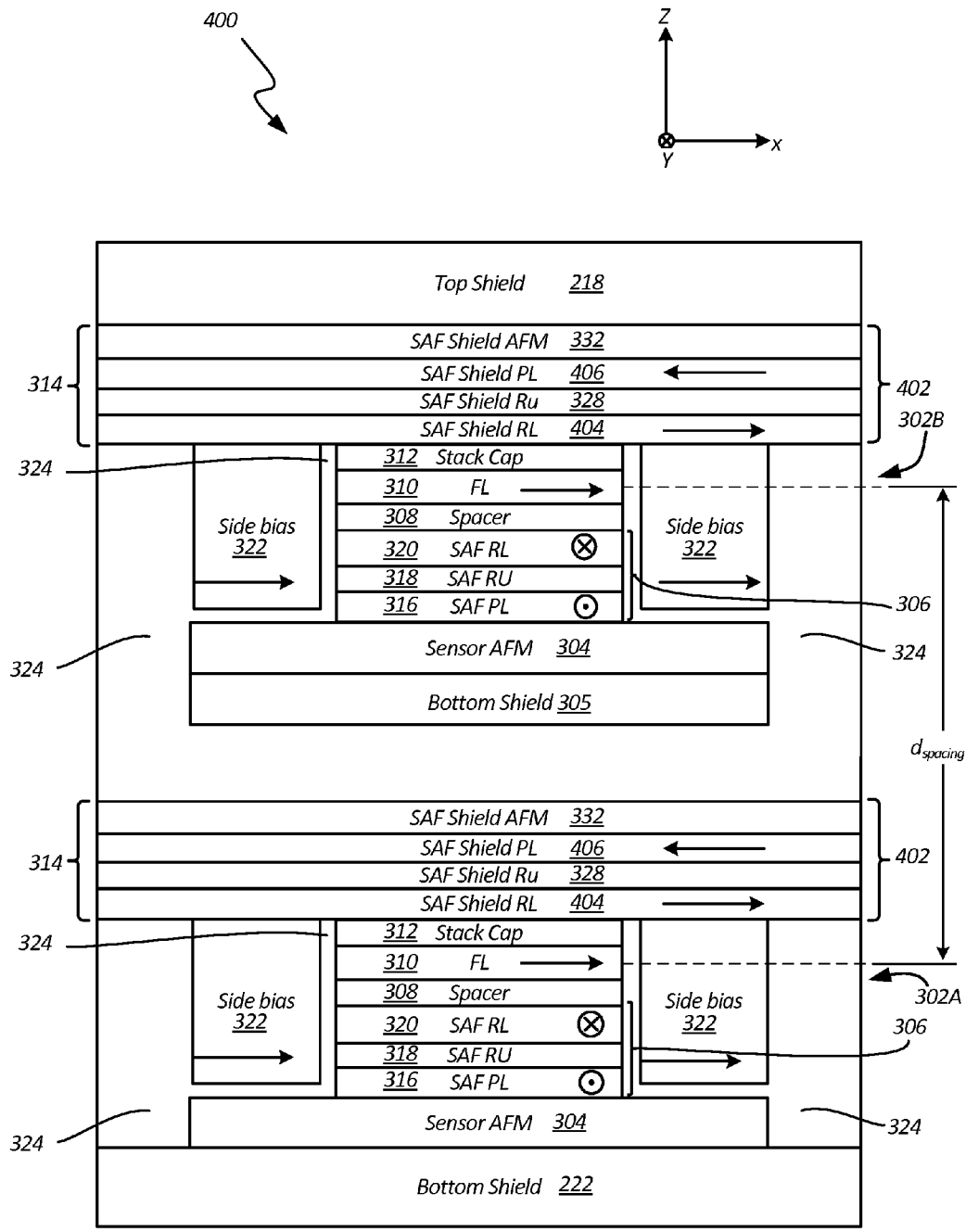
FIG. 4 is a bearing surface view of a multiple sensor reproducing device in accordance with embodiment that employs a high-moment material in its synthetic antiferromagnetic (SAF) shielding element.

FIG. 4 is a bearing surface view of a multiple sensor reader (denoted by reference numeral 400) that employs a high-moment material in its SAF shielding element 402 to reduce d spacing. In other respects, multiple-sensor reader 400 is substantially similar to multi-sensor reader 350 of FIG. 3B and a description of the similar elements is not repeated.

In reader 400, shielding element 402 has as structure that is substantially similar to the SAF shielding element 315 shown in FIG. 3B. However, instead of employing a relatively low moment material (for example, NiFe) as the magnetic material in SAF shield reference layer 326 and SAF shield pinned layer 330 (as in the case of multi-sensor reader 350 of FIG. 3B), the magnetic layers (SAF shield reference layer 404 and SAF shield pinned layer 406) of SAF shielding element 402 are formed of a material having a higher moment than that used for layers 326 and 330 of FIG. 3B. In a certain thickness range (for example, 5 nanometers (nm) to 50 nm), the shielding effect of a SAF element such as 402 is a function of both a thickness of the SAF shielding element such as 402 and a moment of the magnetic layers in the SAF shielding element 402. Accordingly, employing relatively high-moment magnetic layers for the SAF shield reference layer 404 and the SAF shield pinned layer 406 allows for a reduction in thicknesses of these layers without a corresponding reduction in a shielding effect of the SAF element 402 compared to the shielding effect of relatively thick shielding element 315 (of FIG. 3). In some embodiments, the relatively high magnetic moment value of the magnetic layers (SAF shield reference layer 404 and SAF shield pinned layer 406) of SAF shielding element 402 is greater than that of NiFe. In other embodiments, the relatively high magnetic moment value of the magnetic layers (SAF shield reference layer 404 and SAF shield pinned layer 406) of SAF shielding element 402 is greater than about 1.5 Tesla. In such embodiments, examples of relatively high-moment materials that can be utilized for the magnetic layers 404 and 406 are CoFe and CoNiFe. Of course, other high-moment magnetic materials may also be suitable to obtain a reduction in d spacing.

Figure 5A:
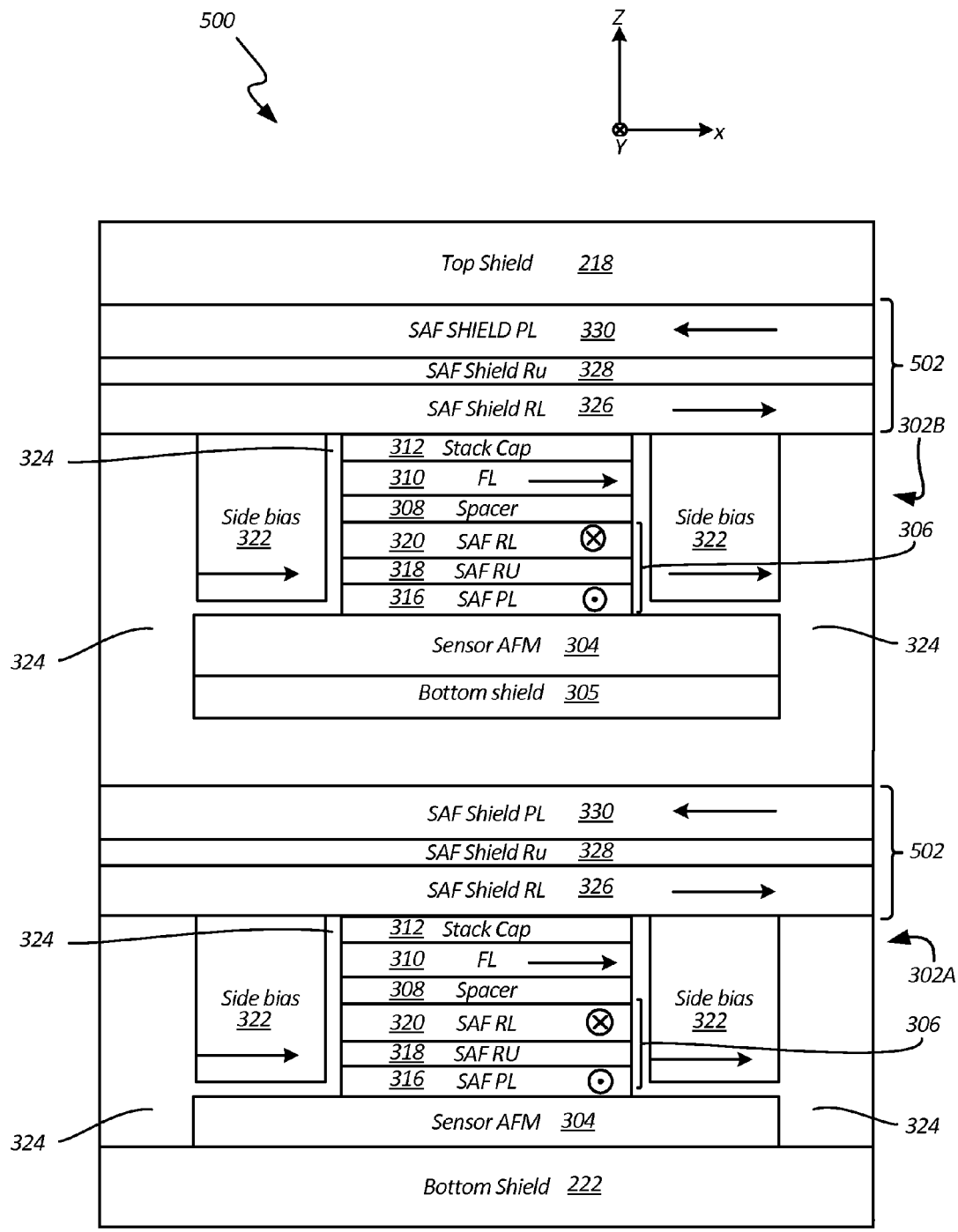
FIG. 5A is a bearing surface view of a multiple sensor reproducing device in accordance with an embodiment in which the SAF shielding element is self-pinned.
Figure 5B:
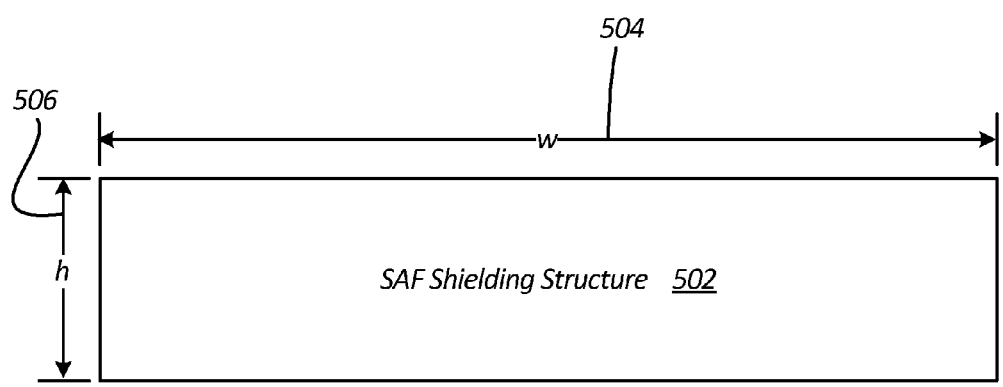
FIG. 5B is a top view of the SAF shielding element of the reproducing device of FIG. 5A.

FIG. 5A is a bearing surface view of a multiple sensor reader (denoted by reference numeral 500) in which SAF shield AFM layers such as 332 of FIGS. 3A and 3B are eliminated to reduce d spacing. To allow for the elimination of the SAF shield AFM layers, the pinning or stabilization functionality provided by the SAF shield AFM layers has to be achieved/provided using a different technique. In one embodiment, SAF shielding structure 502 is stabilized by uniaxial anisotropy induced by shape (for example, different width and height dimensions for SAF 502). FIG. 5B shows a top view of SAF shielding structure 502 in accordance with one embodiment. In the embodiment of FIG. 5B, the uniaxial anisotropy is provided in the SAF shielding structure 502 by employing a width, w (denoted by reference numeral 504), of the SAF shielding structure 502 along the x direction that is substantially larger than a height, h (denoted by reference numeral 506), of the SAF shielding structure 502 along the y direction. In a particular embodiment, the width, w, of the SAF shielding structure 502 is at least twice as large as the height, h, of the SAF shielding structure 502. It should be noted that techniques other than shape anisotropy may be utilized to provide stabilization (i.e., self-pinning) in a SAF shielding structure such as 502. The techniques include film growth with a suitable aligning magnet and/or deposition of the film(s) at a controlled angle of incidence, suitable thermal annealing processes, etc.

Figure 6A:
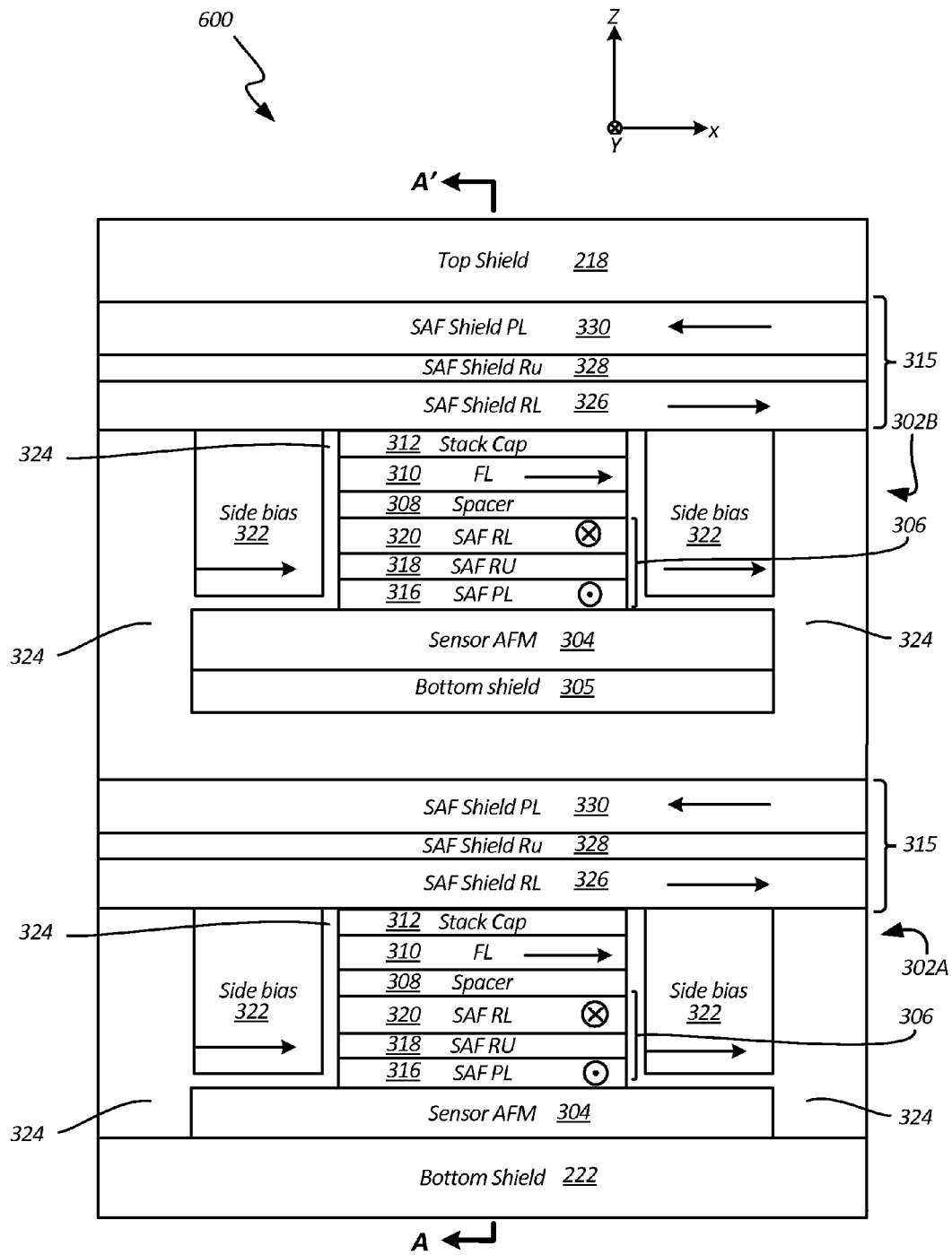
FIG. 6A is a bearing surface view of a multiple sensor reproducing device in accordance with an embodiment in which SAF shield antiferromagnetic (AFM) layers are recessed from the bearing surface.
Figure 6B:
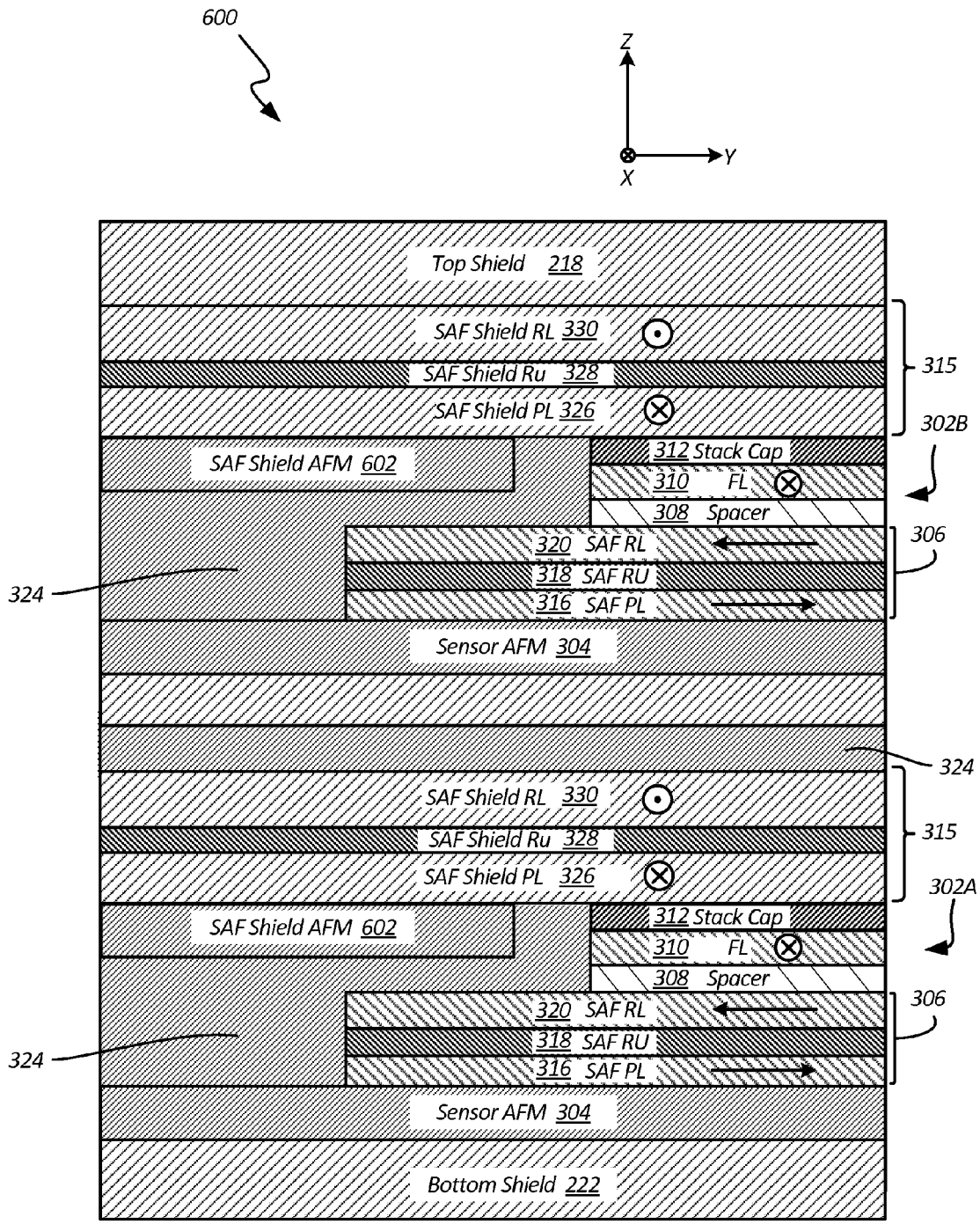
FIG. 6B is a sectional view of the multiple sensor reproducing device of FIG. 6A.

FIG. 6A is a bearing surface view of a multiple sensor reader (denoted by reference numeral 600) in which SAF shield AFM layers such as 332 of FIGS. 3A and 3B are recessed from the bearing surface to reduce d spacing. FIG. 6B is a cross-sectional view of multi-sensor reader 600 of FIG. 6A through a plane orthogonal to the bearing surface and the layers of the sensor stack (along line A-A' shown in FIG. 6A). In FIG. 6B, the recessed SAF shield AFM layers are denoted by reference numeral 602. Since the recessed SAF shield AFM layers 602 do not additively contribute to the d spacing, the reduction in the d spacing obtained in sensor 600 is substantially similar to the d-spacing reduction obtained in sensor 500 (of FIG. 5A). In sensor 600, the unidirectional anisotropy due to the SAF shield AFM 602 helps ensure that the polarity of the SAF (i.e., the magnetic orientations of SAF shield reference layer 326 and SAF shield pinned layer 330 at zero external field) is suitably maintained. The recessed SAF shield AFM layers 602 may be formed using any suitable deposition technique. It should be noted that, in different embodiments, the SAF shield AFM layers 602 may be in locations other than those shown in FIG. 6B as long as the SAF shield AFM layers 602 are able to provide magnetic coupling to the SAF shield element 315. It is a general convention to refer to a SAF magnetic layer adjacent to the AFM as a pinned layer (PL) and to refer to the SAF magnetic layer not in contact with the AFM as a reference layer (RL). In FIG. 6B, the SAF shield AFM layer 602 is below and in contact with layer 326 and therefore layer 326 is the PL and layer 330 is the RL. It should also be noted that the SAF shield AFM layer 602 in only one of the sensors (for example, sensor 302A) may be recessed with the SAF shield AFM layer of the other sensor positioned at a same location as the SAF shield AFM layer 332 of sensor 302B in reader 350 of FIG. 3B.

Figure 7A:
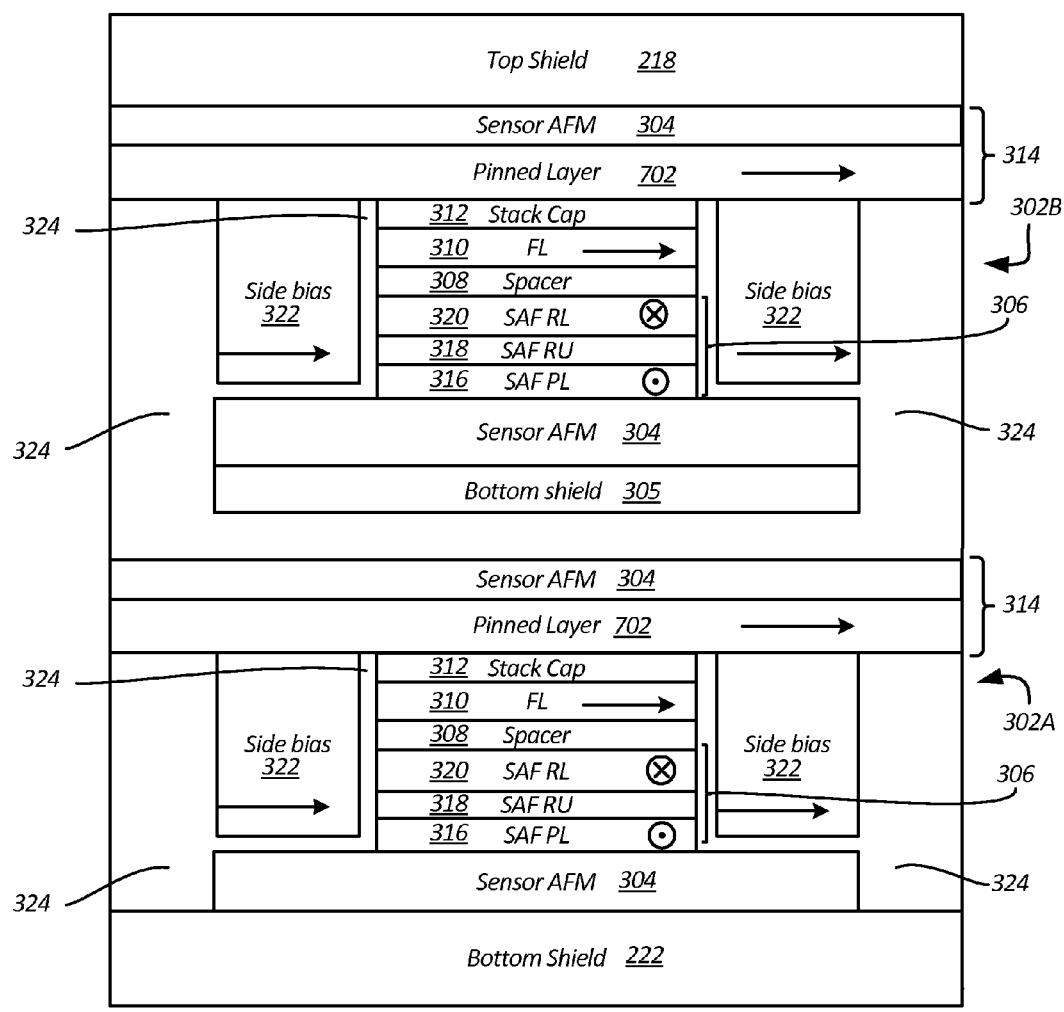
FIG. 7A is a bearing surface view of a dual sensor reproducing device in accordance with an embodiment in which certain SAF shield layers are eliminated.

FIG. 7A is a bearing surface view of a multiple sensor reader 700 in which SAF shield reference layers 326 and SAF shield spacer layers 328 of FIGS. 3A and 3B are eliminated to reduce d spacing. In other words, only a single layer of ferromagnetic material (denoted by reference numeral 702) is pinned by SAF shield AFM 332. By eliminating layers 326 and 328, a z-direction thickness of each the shielding structures 314 may be reduced, thereby resulting in a d-spacing reduction and a reduction in the z-direction thickness of the entire sensor. In some embodiments, the pinned layer 702 is formed of NiFe. In other embodiments, the pinned layer 702 may be formed of a material having a higher moment value than NiFe. When a relatively high moment material is used to form the pinned layer 702, the thickness of the pinned layer 702 may be reduced relative to a NiFe pinned layer without a corresponding reduction in the shielding effect.

Figure 7B:
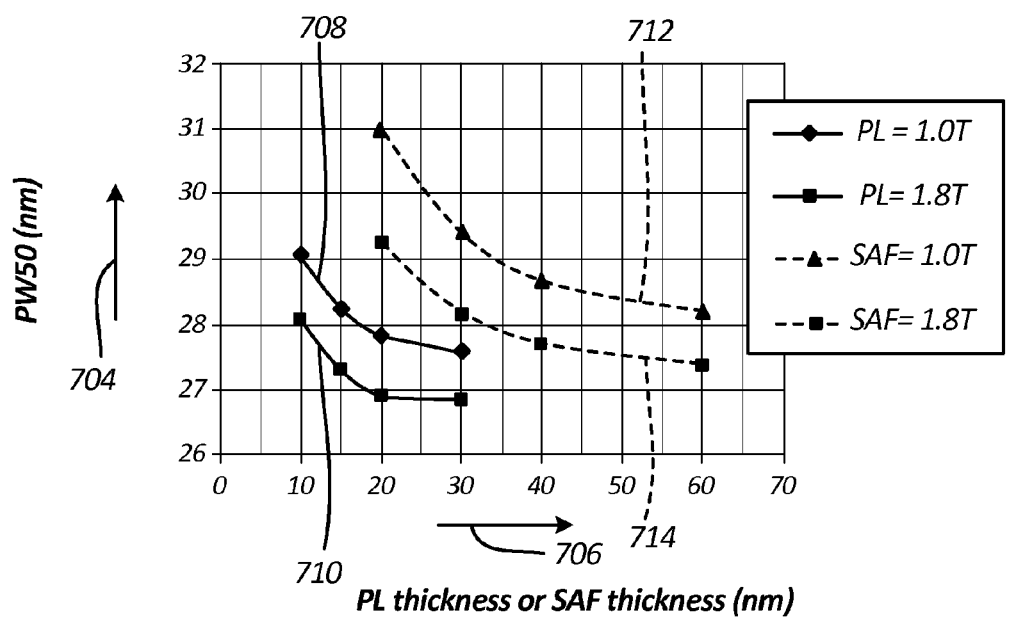
FIGS. 7B, 7C and 7D are plots of results obtained using a reader of the type shown in FIG. 7A and readers of the type shown in FIG. 3A or 3B.

As indicated earlier, achieving a high liner density is essential to achieving a larger capacity per data storage medium. Pulse width or PW50, which is a width of a read pulse at 50% of its peak amplitude, serves as a measure of the potential maximum linear density. A transition that is wider leads to a larger PW50. Thus, a lower PW50 is favorable for higher linear density. In multiple sensor reader 700, utilizing the pinned layer 702 only instead of the SAF structure including layers 326, 328 and 330, may result in improvements in PW50 as shown in FIG. 7B, which is a graph illustrating a comparison of PW50 values for readers with SAF shielding structures (for example, readers 300 (of FIG. 3A) and 350 (of FIG. 3B)) and the pinned-layer (PL) only embodiments. In FIG. 7B, a vertical axis 704 represents PW50 in nm and a horizontal axis 706 represents thickness (i.e., pinned layer thickness and SAF structure thickness) in nm. Plots 708 and 710 (solid lines) are plots for PL-only embodiments such as multiple sensor reader 700. Plot 708 is for a reader in which the PL 702 has a moment value of about 1 Tesla (T) and plot 706 is for a reader in which the PL 702 has a moment value of about 1.8 T. Plots 712 and 714 (dashed lines) are plots for readers with SAF shielding structures (for example, readers 300 (of FIG. 3A) and 350 (of FIG. 3B)). Plot 712 is for a reader in which the SAF has a moment value of about 1 Tesla (T) and plot 714 is for a reader in which the SAF has a moment value of about 1.8 T.

As can be seen in FIG. 7B, compared to a reader embodiment such as 300 (of FIG. 3A) or 350 (of FIG. 3B) that includes the SAF shield element 315 of a particular total thickness, a reader such as 700 with the PL-only structure 702 of a same thickness as the total thickness of the SAF shield element 315 produces about a 3 nm lower PW50. Thus, in a multi-sensor reader, by employing a PL-only structure 702 instead of the SAF including layers 326, 328 and 330 a reduction in thickness, and therefore a corresponding reduction in d spacing, can be obtained without PW50 degradation. For example, a 10 nm PL-only structure 702 yields the same PW50 as a SAF shield element having a 16 nm thick SAF shield reference layer such as 326 and a 16 nm thick SAF shield pinning layer such as 330. In this example, replacing the SAF shield with PL-only structure 702 will result in a 22 nm reduction in d spacing without degrading PW50. Utilizing a relatively high moment material to form structure 702 results in an additional reduction (for example, about a 5 nm reduction) in d spacing without degrading PW50.

Figure 7C:
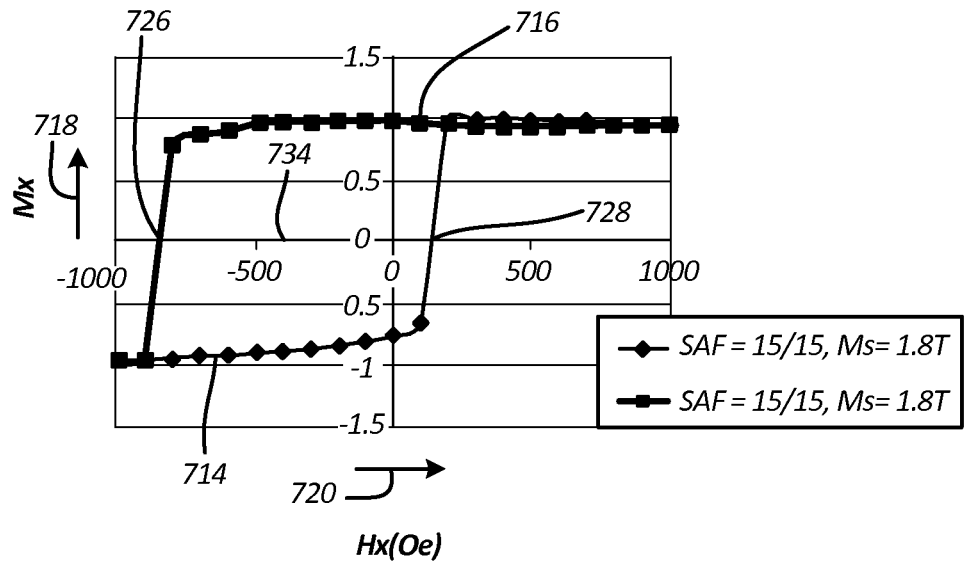
Figure 7D:
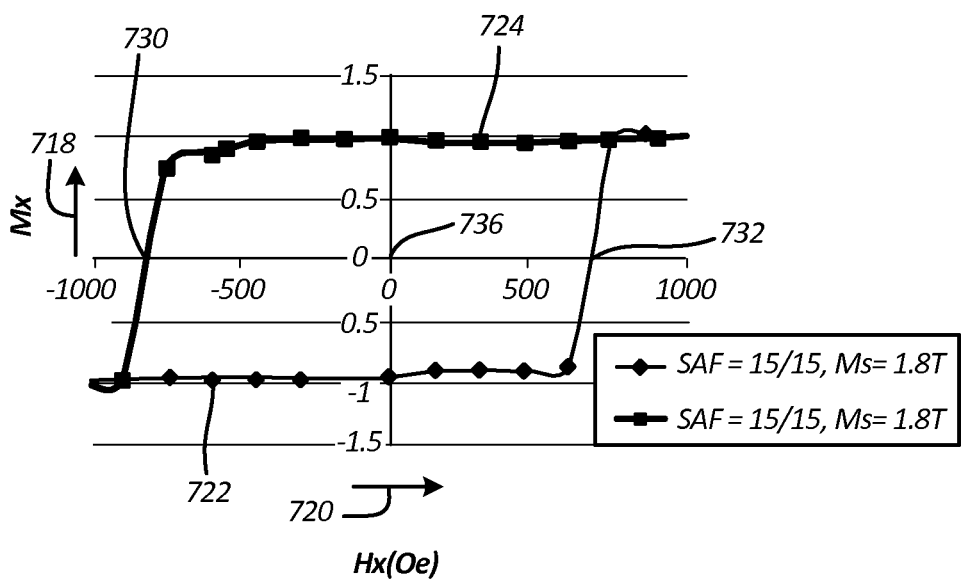

FIG. 7C illustrates cross-track field transfer curves 714 and 716 in a reader such as 300 (of FIG. 3A) or 350 (of FIG. 3B) that includes the SAF shielding element 315. FIG. 7D illustrates cross-track field transfer curves 722 and 724 in a reader embodiment such as 700 that includes a PL-only structure such as 702. In FIG. 7C, a vertical axis 718 represents a normalized magnetization (Mx) of a SAF shield reference layer such as 326 and a horizontal axis 720 represents an applied magnetic field (Hx) in Oersted (Oe). In FIG. 7D, the vertical and horizontal axes are similar to the axes in FIG. 7C, but the vertical axis in FIG. 7D represents the normalized magnetization of a PL-only structure such as 702. In FIG. 7C, plot 714 shows Mx values obtained for the SAF shield reference layer as Hx is increased from negative to positive values. Plot 716 shows Mx values obtained from a reversal of Hx from positive to negative values. Plots 722 and 724 are similar to plots 714 and 716, respectively, but show variations in Mx values in response to variations in Hx values for a PL-only structure such as 702. A comparison of FIGS. 7C and 7D show that a distance between zero-Mx points 726 and 728 in FIG. 7C is substantially less than a distance between corresponding zero-Mx points 730 and 732 in FIG. 7D. Thus, a coercivity width (or coercivity field (H_coercivity)), which is half the distance between the zero-Mx points, is greater in FIG. 7D than in FIG. 7C. Further, at approximately zero Hx, an average point (denoted by reference numeral 734) between points 726 and 728 is left shifted compared to an average point (denoted by reference numeral 736) between points 730 and 732. Thus, an absolute value of the Hx at the average point (i.e., the pinning field (H_pinning) is lower for the PL-only structure such as 702 than the SAF shield element such as 315. Since the PL-only shield design has a lower H_pinning but higher H_coercivity compared to the SAF shielding element, and both designs have a dual state at zero field, the PL-only design has a similar stability as the SAF shield design as long as the cross-track field does not go below −700 Oe.

Figure 7E:
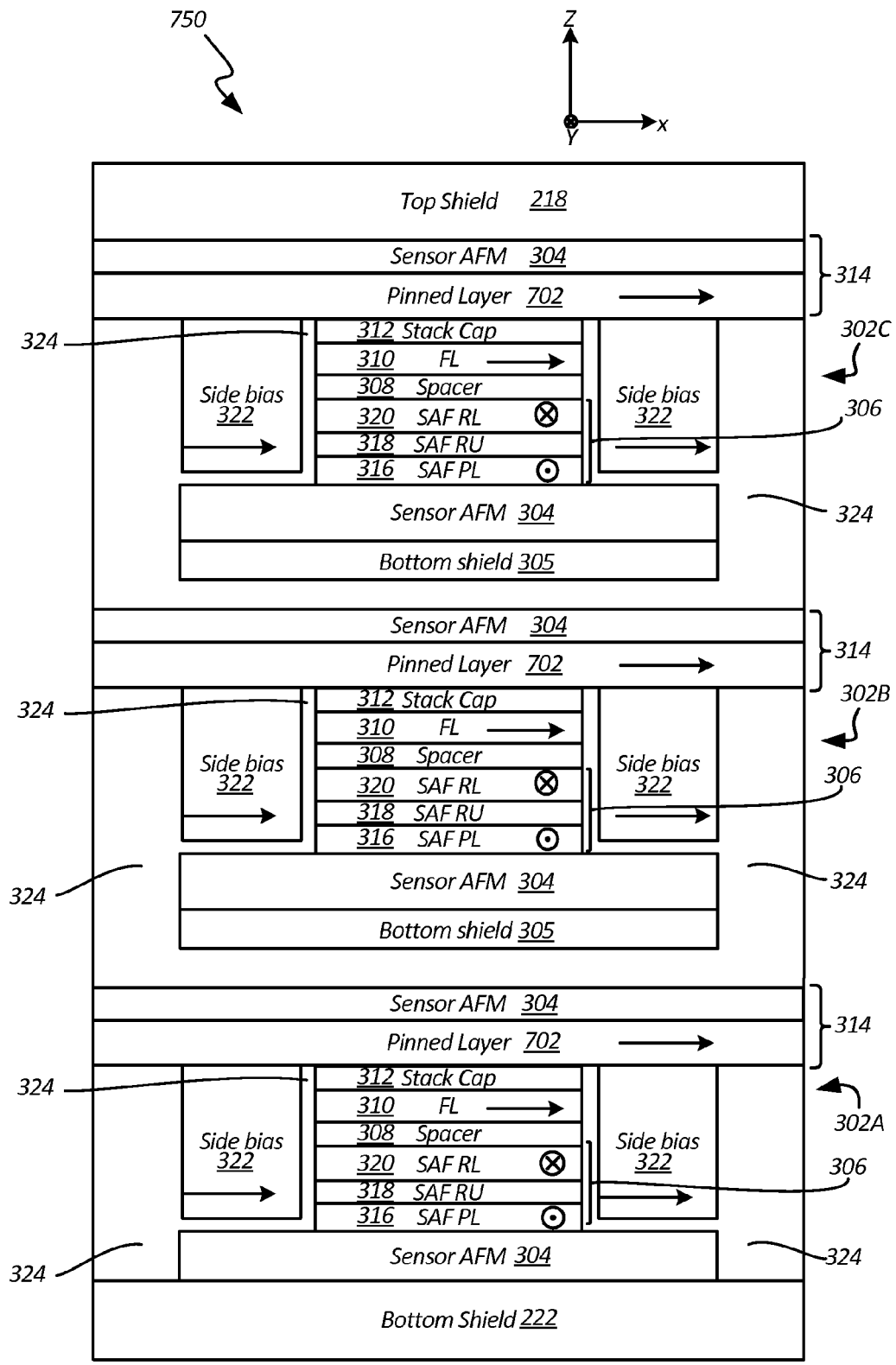
FIG. 7E is a bearing surface view of a multiple sensor reproducing device in accordance with an embodiment in which certain SAF shield layers are eliminated.

The PL-only reader design can be employed for the two-sensor reader 700 shown in FIG. 7A or for a reader 750 with more than two sensors (302A, 302B and 302C) as shown in FIG. 7E. Such readers can provide improvements in PW50, MT10 (distance between two positions on the data storage medium at which the signal strength decreases to 10% of its maximum)/MT50 (distance between two positions on the data storage medium at which the signal strength decreases 50% from its maximum), and downtrack d spacing while preserving reader stability. Depending on the head design needs, PW50 and d spacing can be traded against each other.

Figure 8A:
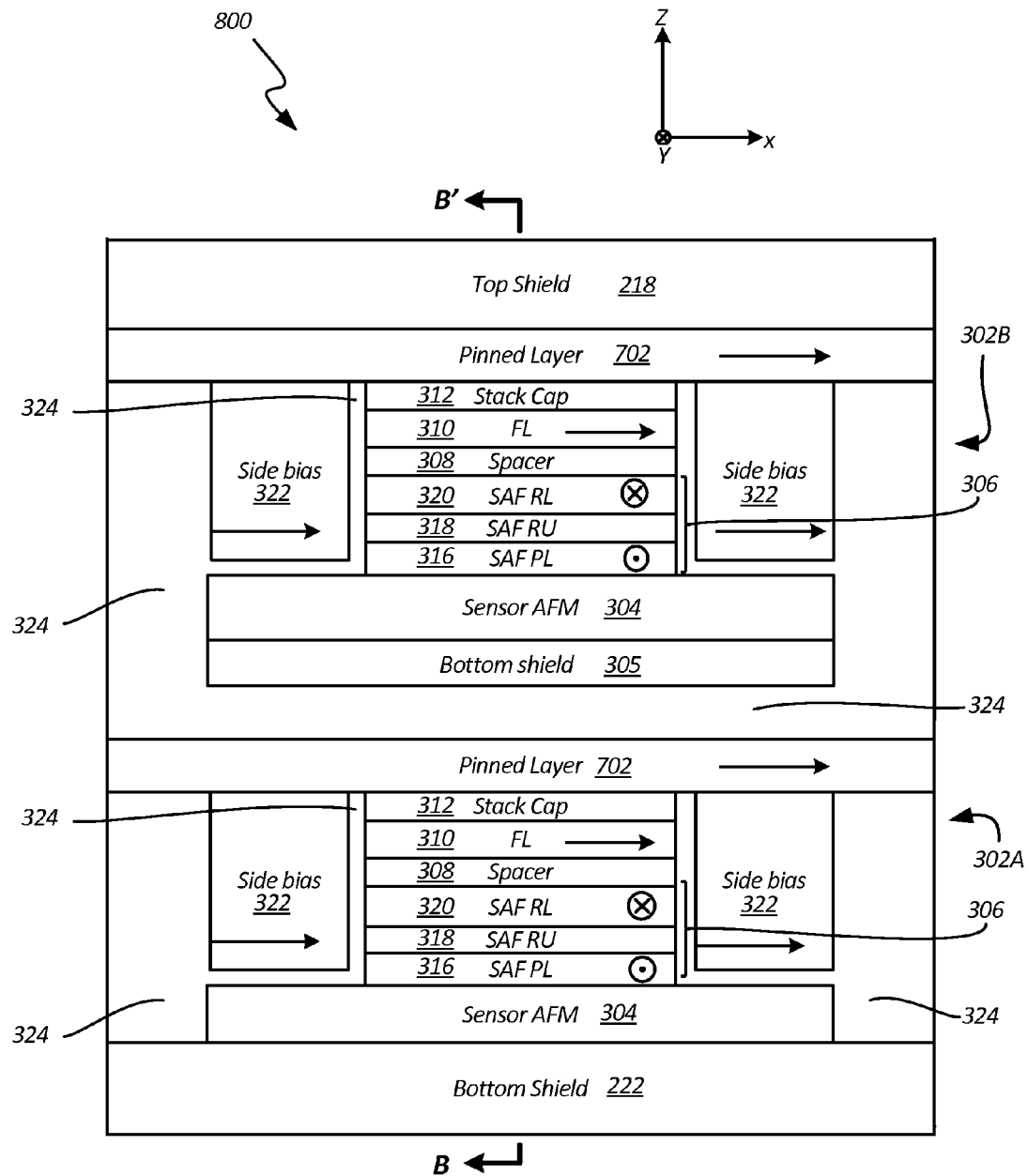
FIG. 8A is a bearing surface view of a multiple sensor reproducing device in accordance with an embodiment in which certain SAF shield layers are eliminated and the SAF shield AFM layers are recessed from the bearing surface.
Figure 8B:
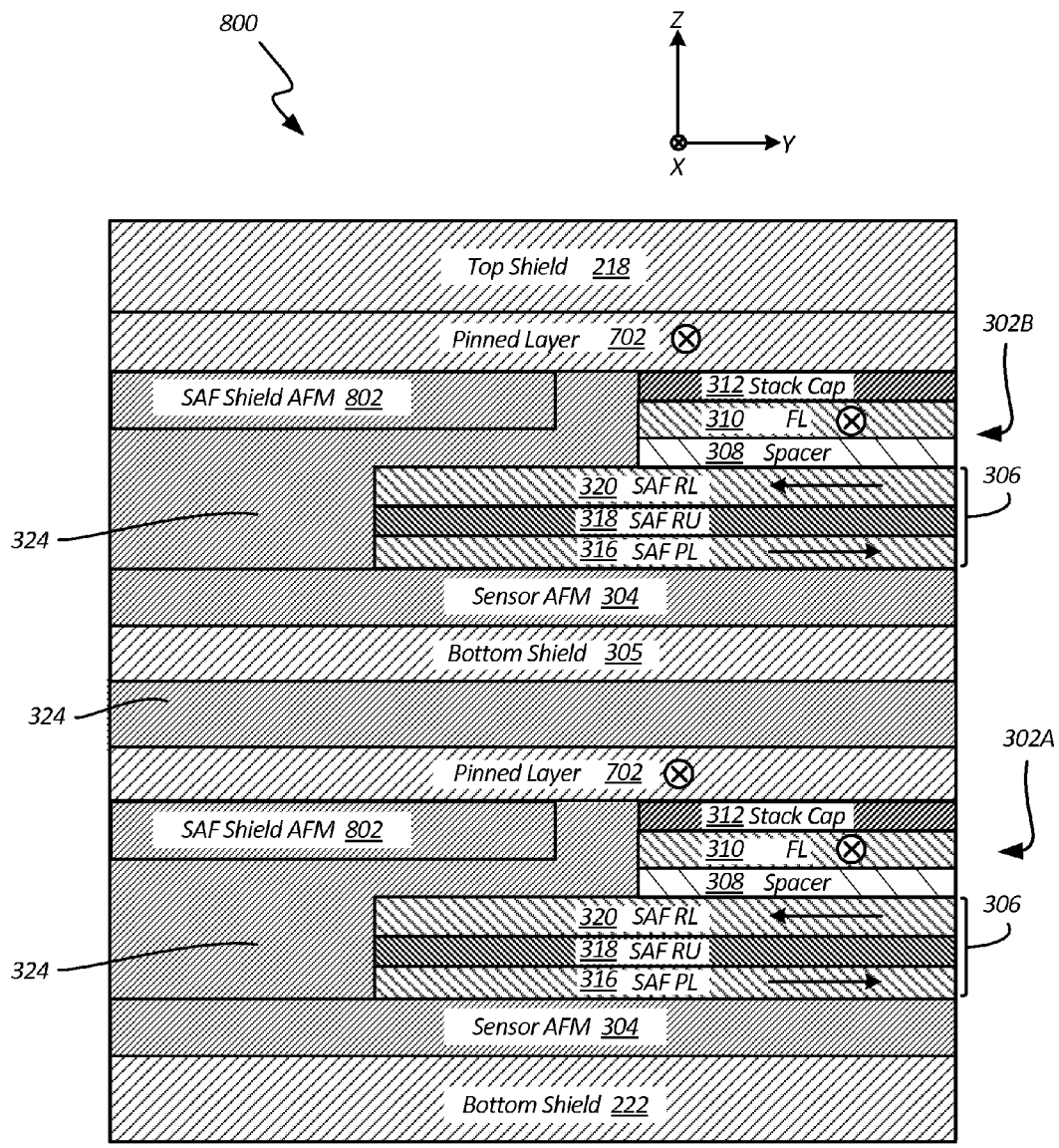
FIG. 8B is a sectional view of the multiple sensor reproducing device of FIG. 8A.

FIG. 8A is a bearing surface view of a multiple sensor reader (denoted by reference numeral 800) in which SAF shield reference layers such as 326 and SAF shield spacer layers such as 328 of FIGS. 3A and 3B are eliminated such that a reduction in d spacing is obtained in a manner described above in connection with FIGS. 7A-7E. Additionally, to obtain a further reduction in d spacing, SAF shield AFM layers such as 332 of FIG. 7A are recessed from the bearing surface. FIG. 8B is a cross-sectional view of multi-sensor reader 800 of FIG. 8A through a plane orthogonal to the bearing surface and the layers of the sensor stack (along line B-B' shown in FIG. 8A). In FIG. 8B, the recessed SAF shield AFM layers are denoted by reference numeral 802. In sensor 800, the unidirectional anisotropy due to the SAF shield AFM 802 helps ensure the polarity of the PL 702 (i.e., the magnetic orientation of the PL 702 at zero external field) is suitably maintained. The recessed SAF shield AFM layers 802 may be formed using any suitable deposition technique. It should be noted that, in different embodiments, the SAF shield AFM layers 802 may be in locations other than those shown in FIG. 8B as long as the SAF shield AFM layers 802 are able to provide magnetic coupling to the PL 702. It should also be noted that the SAF shield AFM layer 802 in only one of the sensors (for example, sensor 302A) may be recessed with the SAF shield AFM layer of the other sensor positioned in a same location as the SAF shield AMF layer 332 of sensor 302B in reader 700 of FIG. 7A.

Figure 9:
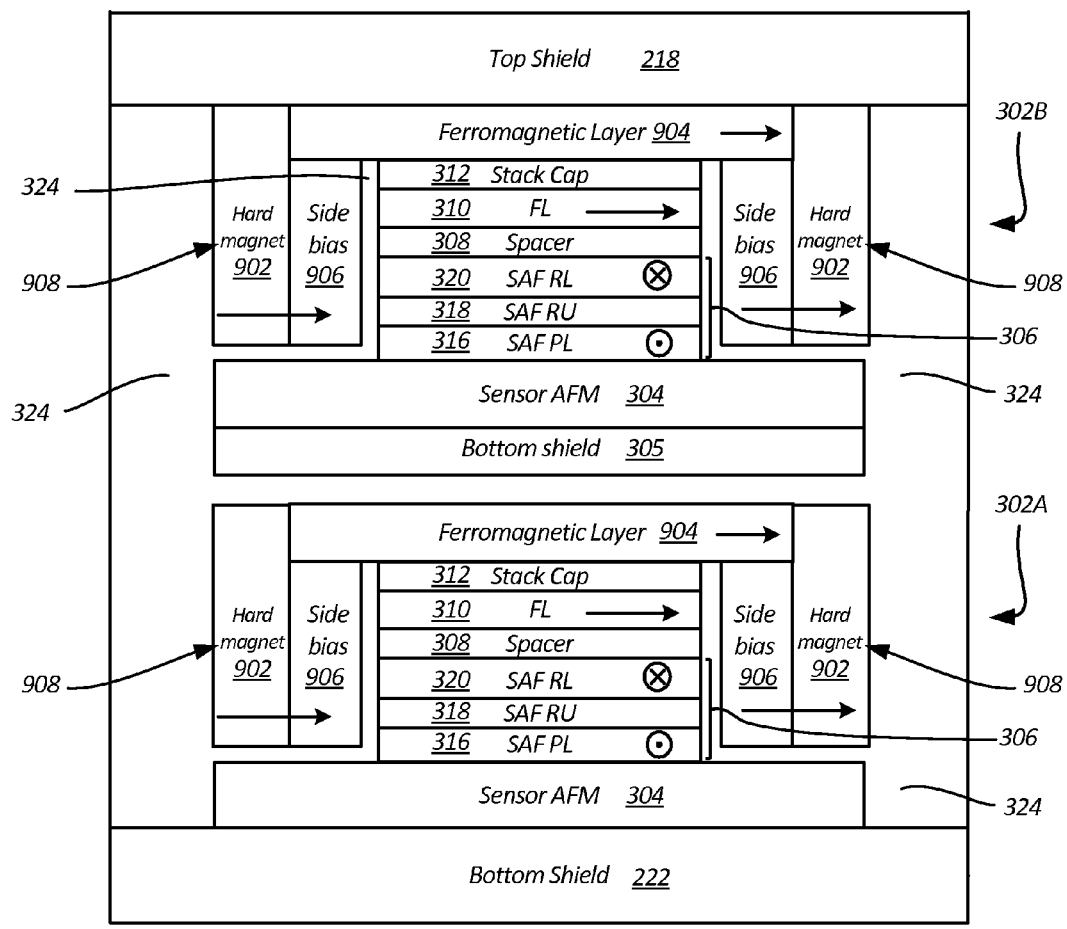
FIG. 9 is a bearing surface view of a multiple sensor reproducing device in accordance with an embodiment in which certain SAF shield layers are eliminated and hard magnetic layers are employed to bias soft magnetic layers in the shields.

FIG. 9 is a bearing surface view of a multiple sensor reader 900 in which SAF shield reference layers such as 326 and SAF shield spacer layers such as 328 of FIGS. 3A and 3B are eliminated such that a reduction in d spacing is obtained in a manner described above in connection with FIG. 7A, for example. Additionally, instead of the AFM shield layers 322 employed in FIG. 7A, hard biasing magnets 902 abut ferromagnetic layers 904 and provide necessary stabilization for the ferromagnetic layers 904 from either side of the ferromagnetic layers 904. Further, in the embodiment shown in FIG. 9, hard biasing magnets 902 and a soft magnetic layer 906 are in a side-by-side configuration in each of side shields 908. In each of sensors 302A and 302B of FIG. 9, the soft magnetic layer 906 is magnetostatically or exchange coupled to the hard biasing magnet 902 and serves to shunt flux from bits adjacent to the bit being read.

Figure 10A:
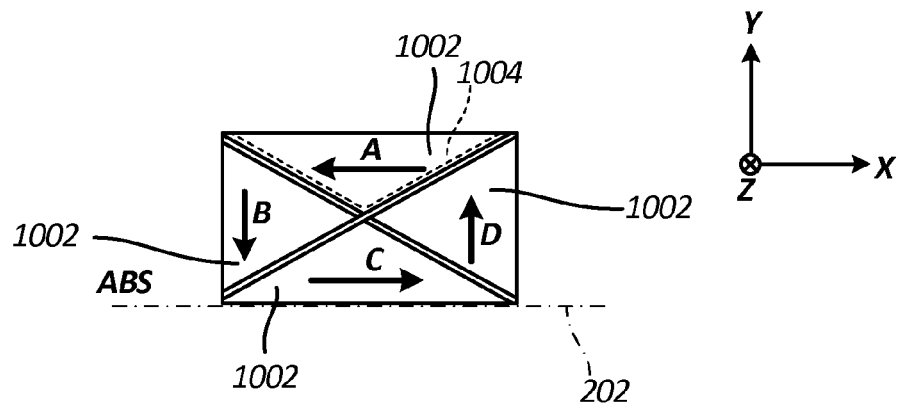
FIGS. 10A-10E are diagrammatic illustrations that collectively illustrate a multi-sensor reader in which a shape of the SAF shielding structure is engineered to provide a closure domain.
Figure 10B:
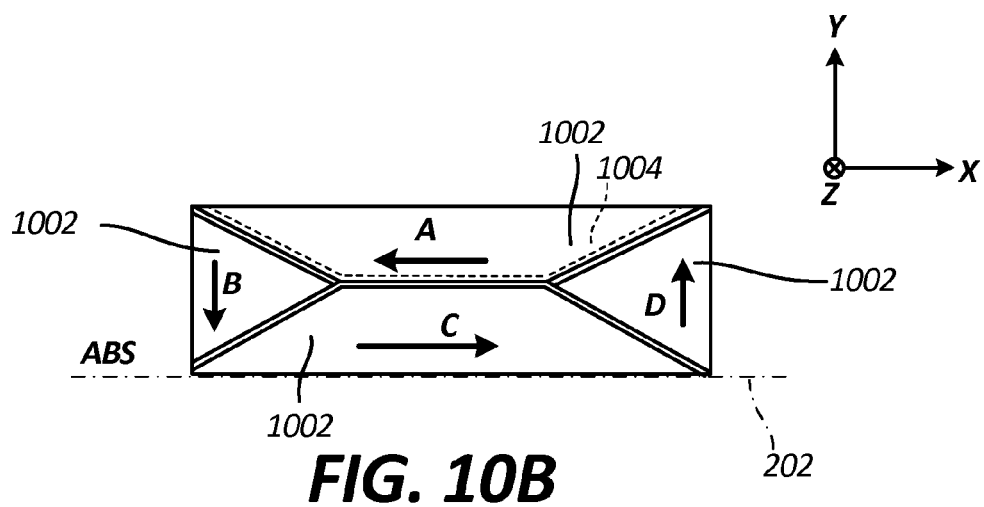
Figure 10C:
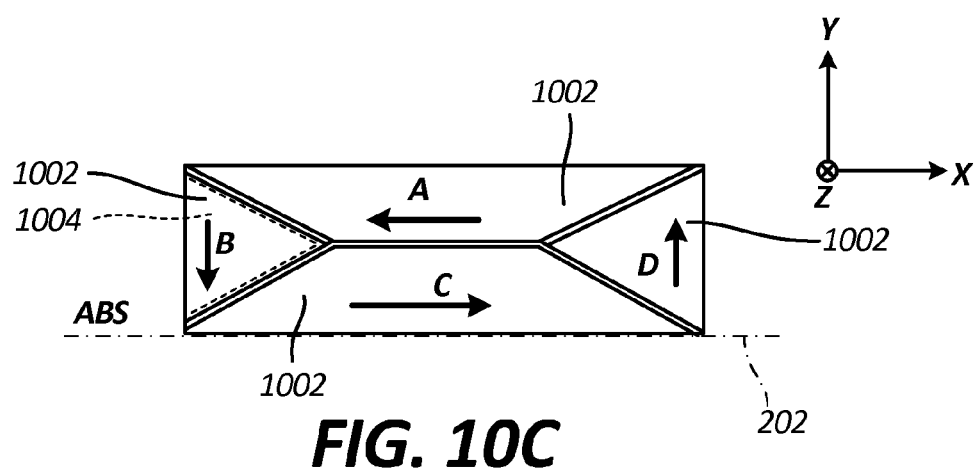
Figure 10D:
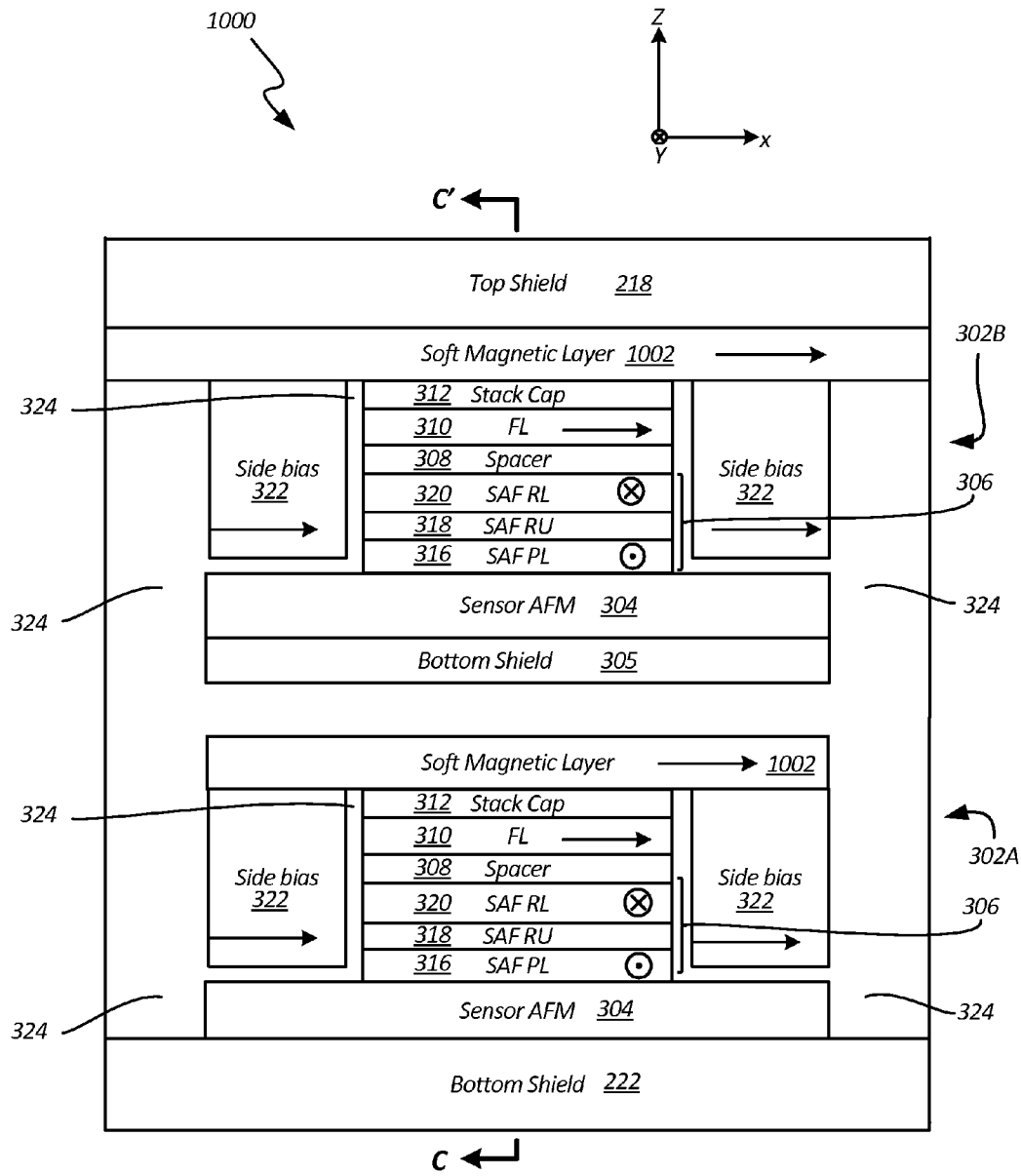
Figure 10E:
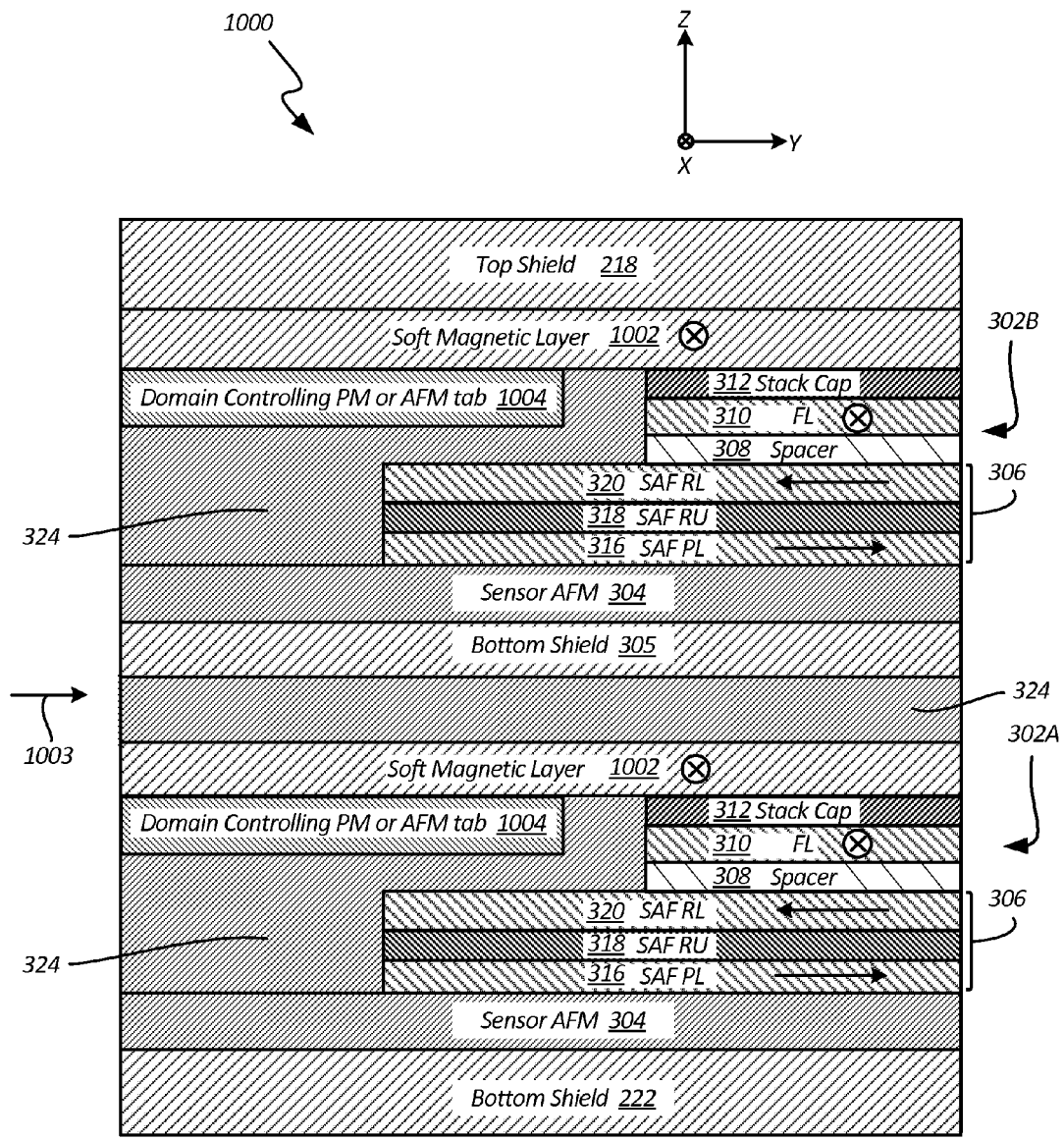

FIG. 10A-10E are diagrammatic illustrations that collectively illustrate a multi-sensor reader embodiment (denoted by reference numeral 1000 in FIGS. 10D and 10E) in which a d-spacing is reduced relative to a d-spacing of multi-sensor reader 350 of FIG. 3B. In the embodiment of FIGS. 10A-10E, a shape of the SAF shielding structure 314 in the x-y plane (i.e., a plane parallel to layers of the reader stack and perpendicular to a bearing surface of the multi-sensor reader) is engineered to provide a closure domain. FIGS. 10A, 10B and 10C show top views of an example design in which four major domains (A, B, C and D) are formed. The top portions shown in FIGS. 10A, 10B and 10C include soft magnetic layers denoted by reference numeral 1002. A permanent magnet (PM) or AFM tab 1004 is coupled to one of the domains to control a chirality of the domain structure. Domain C is at the bearing surface. PM tab or AFM tab 1004 may be attached to domain A, B, or D to ensure chirality without increasing d-spacing. It should be noted that the PM tab or AFM tab 1004 may be positioned below the soft magnetic layer 1002 and recessed from the bearing surface. Accordingly, the PM or AFM tab 1004 is not visible in the bearing surface view of sensor 1000 in FIG. 10D. However, PM or AFM tab 1004 is shown in FIG. 10E which is a cross-sectional view of multi-sensor reader 1000 of FIG. 10D through a plane orthogonal to the bearing surface and the layers of the sensor stack (along line C-C' shown in FIG. 10D). An added benefit of attaching PM/AFM tab 1004 to B or D is that the orientation of this tab can be set by a magnetic stack anneal (which has a y direction magnetic field (denoted by reference numeral 1003 in FIG. 10E) and no additional anneal is needed. In other words, during manufacture of the reader 1000 in which a PM/AFM tab 1004 is attached to domains B or D, annealing of both the sensor stack 302A, 302B and the stabilization feature (for example, PM/AFM tab 1004) may be carried out in a single annealing step in a presence of a magnetic field such as 1003 along an axis (for example, y-axis) that is substantially perpendicular to the bearing surface to set magnetization directions of both the stabilization feature (for example, PM/AFM tab 1004) and sensor stack AFM SAF layers in the single annealing step, thereby avoiding separate magnetization-direction-setting annealing steps for the sensor stack 302A, 302B and the stabilization feature (for example, PM/AFM tab 1004).

In yet another embodiment, insulating spacer layer 324 between sensor 302A and sensor 302B in any of the above-described embodiments may be formed of a material that has a dielectric constant ($\in_r$) value that is lower than a dielectric constant value of alumina (i.e., an $\in_r$ value that is less than about 9). One example of a material with a relatively low $\in_r$ value that is suitable for forming a reduced-thickness insulating spacer layer is $SiO_2$, which has an $\in_r$ value of about 4. Of course, other dielectric materials with relatively low $\in_r$ values may be suitable in different embodiments. When the $∈_r$ value is relatively low/small as in the case of SiO$_2$, a smaller thickness can be achieved for the insulating spacer layer 324 without a decrease in capacitance compared to the capacitance of a relatively thick alumina insulating spacer layer, for example. Thus, employing SiO$_2$, for example, for the insulating spacer layer 324 may result in a reduction in d spacing.

Figure 11A:
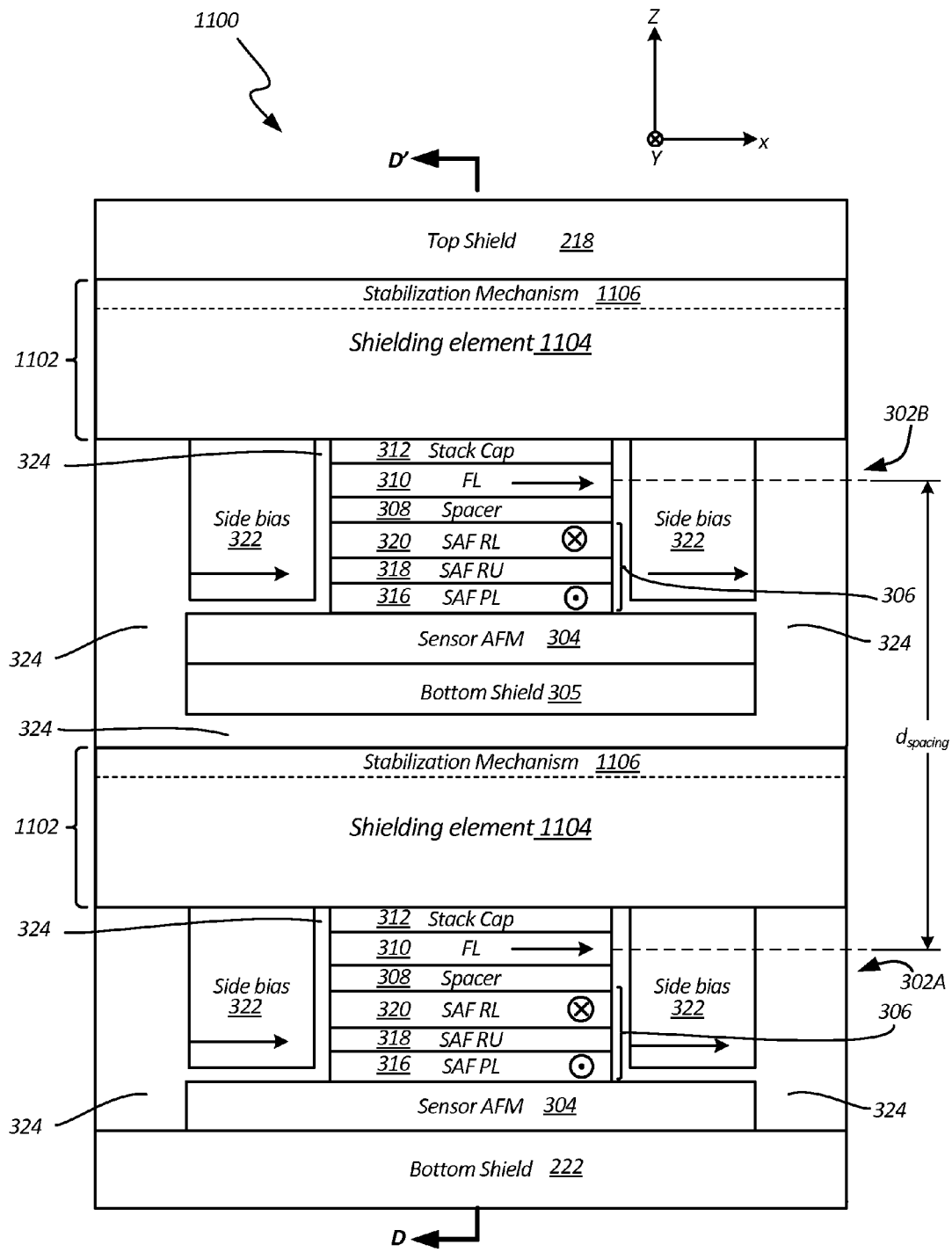
FIGS. 11A-11C are diagrammatic illustrations that collectively illustrate a multiple sensor reader in accordance with an embodiment that combines features of other embodiments.
Figure 11B:
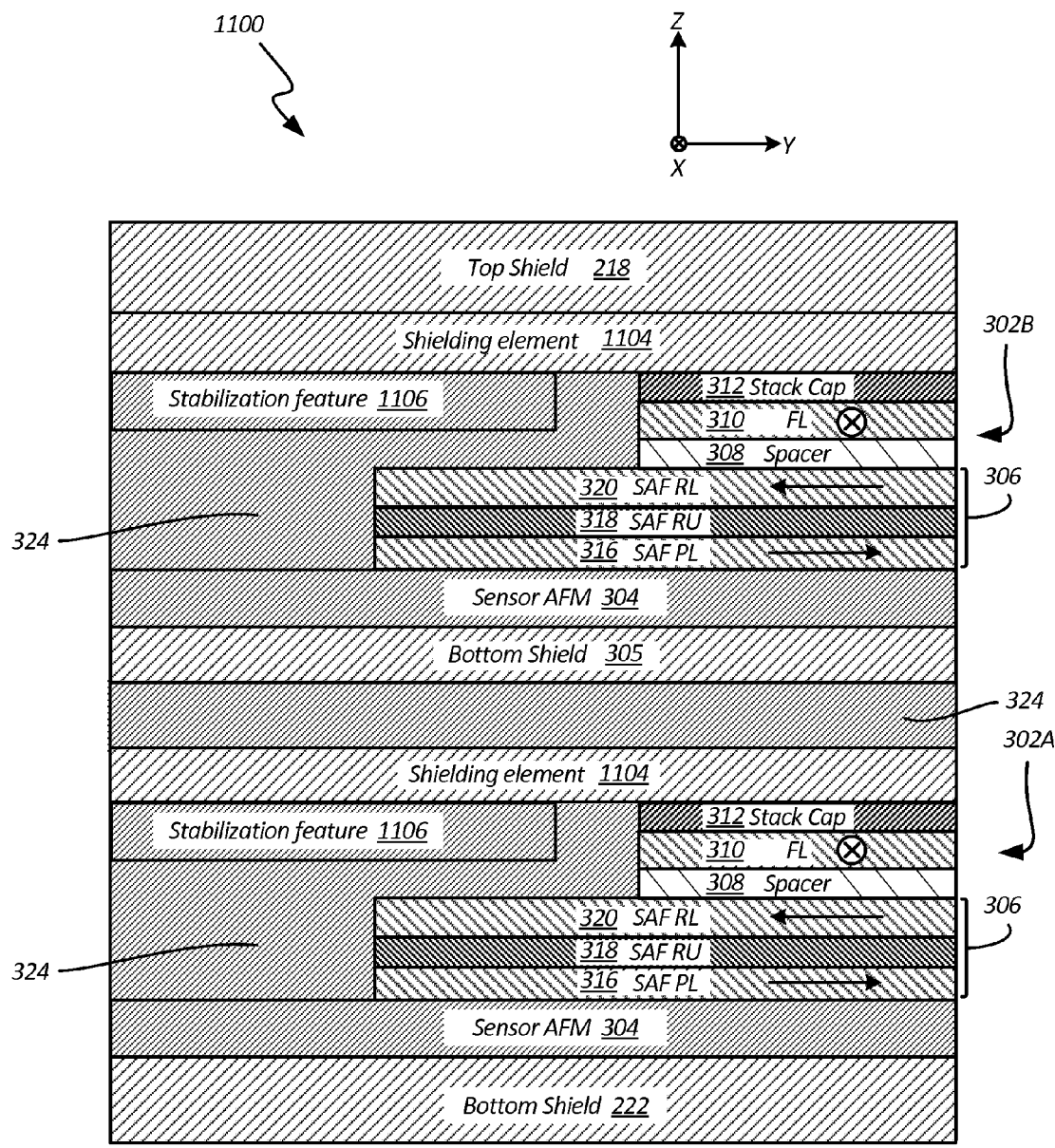
Figure 11C:
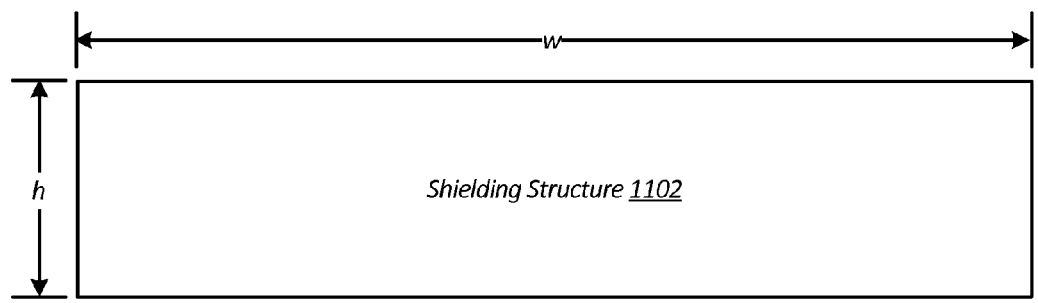

FIGS. 11A, 11B and 11C collectively illustrate an embodiment of a multi-reader sensor 1100 that includes a combination of different d-spacing reduction features described above. In sensor 1100, the shielding structure 1102 (similar to shielding structure 314) is shown as generally comprising a shielding element 1104 (similar to structures 315 and 702) and a stabilization mechanism 1106 (similar to layers or tabs 322, 602, 802, 902 and 1004) for the shielding element. In this embodiment, insulating spacer layer 324 is formed of a relatively low $∈_r$ material such as SiO$_2$. Shielding element 1104 includes at least one ferromagnetic layer formed of a material having a magnetic moment value that is greater than that of NiFe. Stabilization mechanism 1106 may include at least one stabilization feature (AFM or PM tab) that is separate from the shielding element 1104 that is located within the multi-sensor reader at a position in which the stabilization feature does not substantially additively contribute to the d spacing (i.e., the at least one stabilization feature may be recessed from the bearing surface as shown in FIG. 11B (sectional view along line D-D' of FIG. 11A) or be positioned on sides of the ferromagnetic layer and side biasing soft magnetic layers as shown in FIG. 9). Further, at least a portion of the stabilization mechanism 1106 may be incorporated into the shielding element 1102 by using, for example, a self-pinning technique such as shape anisotropy as shown in FIG. 11C and described above in connection with FIGS. 5A and 5B. As noted earlier, other self-pinning techniques that may be suitable include film growth with an aligning magnet and/or deposition of the film(s) at a controlled angle of incidence, suitable thermal annealing processes, etc.

It should be noted that, although the different figures show bottom and top sensors 302A and 302B aligned with each in the z direction, different sensors may be offset from each other in various embodiments. It should also be noted that the techniques for reducing a thickness of the shielding structure may also be employed in a single-sensor reader to reduce a spacing between top shield 218 and bottom shield 222.

Although various examples of inter-sensor spacing reduction features within multiple sensor magnetic reproducing devices are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the multiple sensor magnetic reproducing device with the inter-sensor spacing reduction feature while maintaining substantially the same functionality without departing from the scope and spirit of the present disclosure. In addition, although the embodiments described herein are directed to a particular type of multiple sensor magnetic reproducing device utilized in a particular data storage system, it will be appreciated by those skilled in the art that the teachings of the present disclosure can be applied to other data storage devices without departing from the scope and spirit of the present disclosure.

What is claimed is:

1. A multi-sensor reader comprising:
    a first sensor comprising:
        a sensor stack having a free layer (FL) that has a magnetization that changes according to an external magnetic field; and
        a shielding structure positioned over the sensor stack, wherein the shielding structure comprises a shielding element and a stabilization mechanism for the shielding element, wherein the shielding element comprises a closure domain in a plane parallel to layers of the sensor stack and perpendicular to a bearing surface of the multi-sensor reader, and wherein the closure domain comprises a plurality of individual domains, with one of the plurality of individual domains being substantially at the bearing surface and the other ones of the plurality of individual domains being not substantially at the bearing surface;
    a second sensor stacked over the first sensor, the second sensor comprising a sensor stack having a FL that has a magnetization that changes according to the external magnetic field; and
    a FL-to-FL spacing reduction feature included in the shielding structure, the FL-to-FL spacing reduction feature comprising:
        the stabilization mechanism comprising at least one stabilization feature separate from the shielding element and recessed from the bearing surface of the multi-sensor reader, wherein the stabilization feature comprises a permanent magnet (PM) tab or an antiferromagnetic (AFM) tab that is attached to one of the plurality of individual domains that is not substantially at the bearing surface, and wherein the PM tab or AFM tab is not attached to the one of the plurality of individual domains that is substantially at the bearing surface, and wherein the PM tab or AFM tab reinforces a chirality of the closure domain.

2. The multi-sensor reader of claim 1 and further comprising a relatively thin isolation layer separating the first sensor from the second sensor, wherein the isolation layer is formed of a material having a dielectric constant value lower than about 9.

3. The multi-sensor reader of claim 1 and wherein the relatively thin isolation layer comprises SiO$_2$.

4. A multi-sensor reader comprising:
    a first sensor comprising:
        a sensor stack having a free layer that has a magnetization that changes according to an external magnetic field;
        a shielding structure positioned over the sensor stack, wherein the shielding structure comprises:
            a shielding element comprising at least one magnetic layer;
            a stabilization mechanism for the shielding element; and
            a side biasing magnet comprising a hard magnetic layer that has a lower portion positioned on a side of the sensor stack and an upper portion that is positioned coplanar with the shielding element, wherein the upper portion of the hard magnetic layer comprises the stabilization mechanism for the shielding element; and a second sensor stacked over the first sensor, the second sensor comprising a sensor stack having a free layer that has a magnetization that changes according to the external magnetic field.

5. The multi-sensor reader of claim 4 and wherein the at least one magnetic layer of the shielding element comprises a material having a magnetic moment value greater than about 1 Tesla.

6. The multi-sensor reader of claim 4 and wherein the at least one magnetic layer of the shielding element comprises a material having a magnetic moment value greater than about 1.5 Tesla.

7. The multi-sensor reader of claim 4 and further comprising a relatively thin isolation layer separating the first sensor from the second sensor, wherein the isolation layer is formed of a material having a dielectric constant value lower than about 9.

8. The multi-sensor reader of claim 7 and wherein the relatively thin isolation layer comprises $SiO_2$.

* * * * *